F. E. MILLER.
LARYNGOSCOPE.
APPLICATION FILED FEB. 14, 1918.

1,283,256.

Patented Oct. 29, 1918.

INVENTOR.
Frank E. Miller
BY
his ATTORNEY.

UNITED STATES PATENT OFFICE.

FRANK E. MILLER, OF NEW YORK, N. Y.

LARYNGOSCOPE.

1,283,256.  Specification of Letters Patent.  Patented Oct. 29, 1918.

Application filed February 14, 1918. Serial No. 217,046.

*To all whom it may concern:*

Be it known that I, FRANK E. MILLER, a citizen of the United States, and a resident of the city, county, and State of New York, have invented certain new and useful Improvements in Laryngoscopes, set forth in the following specification.

This invention relates to apparatus for studying the larynx and particularly the size and relative positioning of the vocal cords, and I have found it useful in connection with my vocal art science.

On account of the inaccessible location of the larynx, the interior of which is viewable solely through the glottis, special instrumentalities are necessary for its study. The object of my invention is to facilitate the accurate measurement and relative positioning of various parts of the larynx, particularly the right and left vocal cords. To this end I have devised a laryngoscope provided with one or more measuring scales preferably two arranged at an angle to each other.

My invention will better be understood by reference to the illustrative embodiment shown in the accompanying drawings and described in the following specification.

In the drawings

I have found in studying the vocal organs of recognized artists that a more or less uniform standard both as to size, configuration and relative positioning of the vocal cords exists, and that a divergent angular opening exists between the right and the left vocal cords, the wider part of the opening being toward the arytenoid cartilage.

Figure 3:
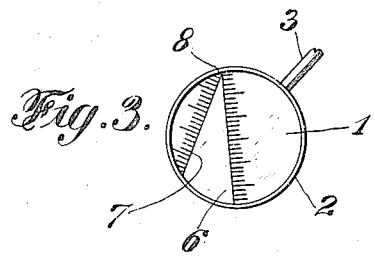
Fig. 3 is a front elevation of the mirror part of the same with the handle broken off.

In the drawings 1 is a flat circular mirror, preferably mounted in an approved manner in the metal frame 2, which is provided with an offset stem 3, adjustably mountable in a handle 4, in which it may be clamped by the set screw 5. Either on the exposed face of the mirror 1 or in the reflecting plating on the rear surface of the mirror 1, I provide a straight edge scale 6, preferably diametrically positioned about as shown in Fig. 3, relatively to the handle 4. This scale may have any desired dimensional marking. I prefer also to provide a second scale 7 diverging from the apex 8 at an angle preferably of 30° from the scale 6. I prefer to have the scale 7 provided with the same dimensional marking as the scale 6.

Figure 1:
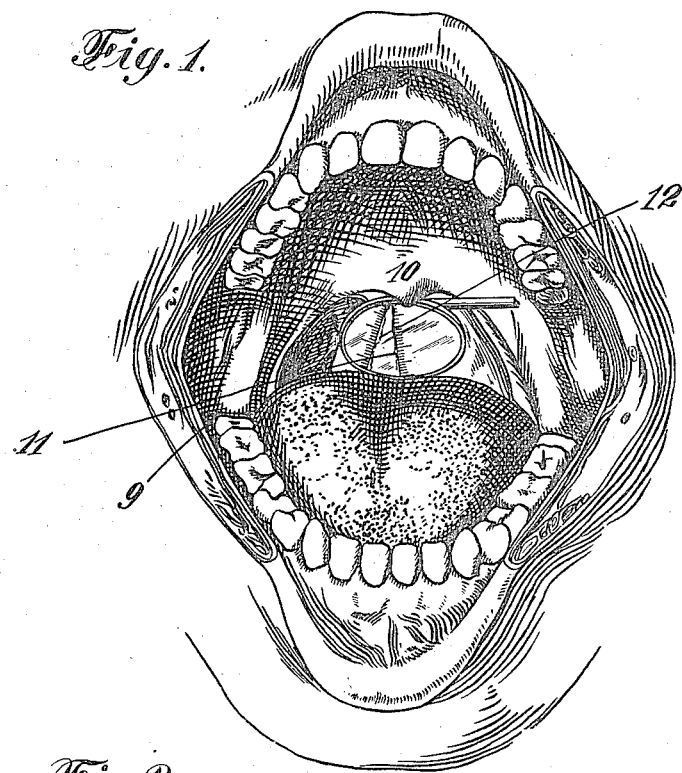
Figure 1 is a perspective view showing my laryngoscope in operation.
Figure 2:
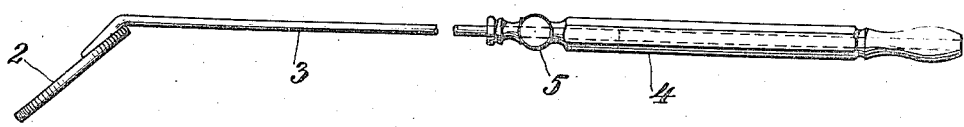
Fig. 2 is a side elevation with parts broken away of my laryngoscope.

In employing my laryngoscope all that is necessary is to insert the same in the subject's mouth 9 to the rear of the palate 10, whereupon a direct measurable comparison between parts of the larynx and the scales 6 and 7 may be made. For example, as shown in Fig. 1, the lines 11 and 12 indicate the edges of the left and right vocal cords being compared directly with the scales.

When employing this laryngoscope the operator should familiarize himself with the critical angles at which the mirror should be held relatively to the patient's larynx. Practice in the hands of a skilled surgeon soon teaches many ways in which this instrument may be employed to facilitate vocal diagnosis from the standpoint of the surgeon.

What I claim and what I desire to secure by United States Letters Patent is:—

1. An exploring instrument to aid the ocular examination of a partially visibly obscured organ in an openable cavity of the body comprising a manipulating handle and a mirror mounted on said handle, said mirror being provided to be visible on its face with a standard marking for relative comparison by superposition with the reflected image of the organ under examination.

2. A laryngoscope comprising a mirror provided with two relatively divergent scales.

3. A laryngoscope comprising a mirror provided with two divergent straight lines.

In testimony whereof I have signed my name to this specification this 25th day of January, 1918.

FRANK E. MILLER.